C. D. PETTIS.
BRAKE SHOE.
APPLICATION FILED OCT. 31, 1908.

935,053.

Patented Sept. 28, 1909.
2 SHEETS—SHEET 1.

Witnesses:

Inventor:
Clifton D. Pettis
by:-
Peirce & Fisher
Attys.

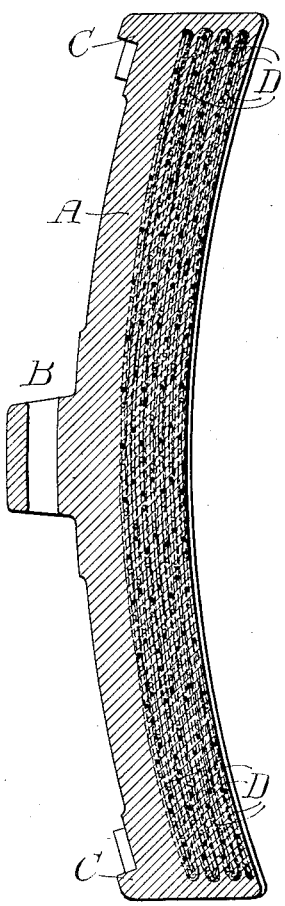
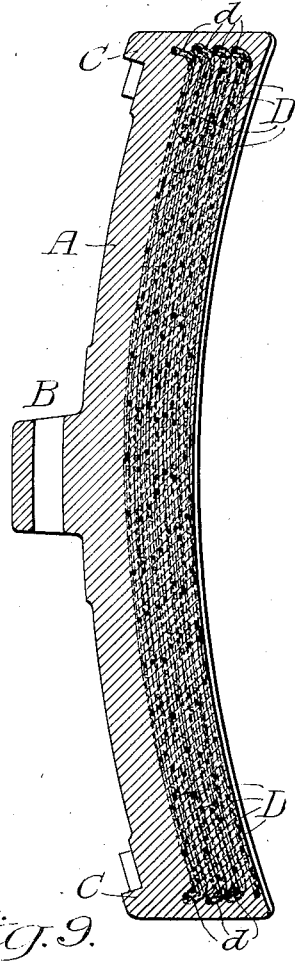
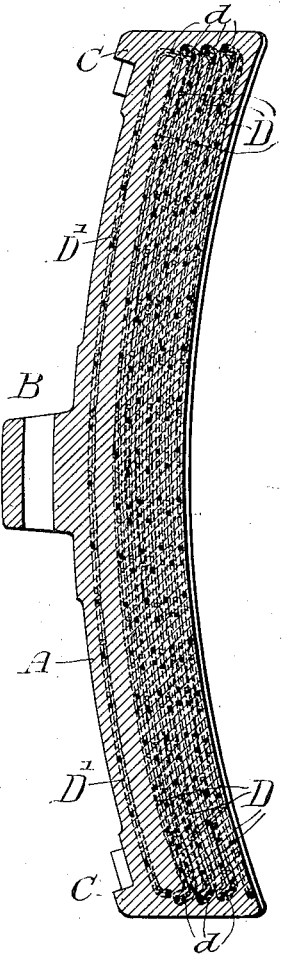
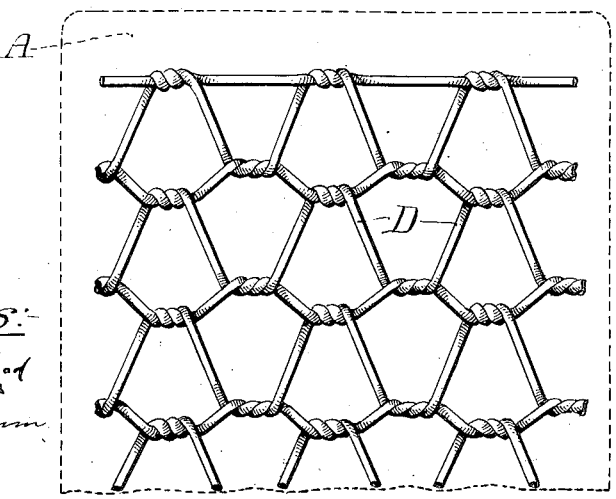

UNITED STATES PATENT OFFICE.

CLIFTON D. PETTIS, OF CHICAGO, ILLINOIS, ASSIGNOR TO NATIONAL BRAKE SHOE COMPANY, OF CHICAGO, ILLINOIS, A CORPORATION.

BRAKE-SHOE.

935,053. Specification of Letters Patent. Patented Sept. 28, 1909.

Application filed October 31, 1908. Serial No. 460,390.

*To all whom it may concern:*

Be it known that I, CLIFTON D. PETTIS, a citizen of the United States, and a resident of the city of Chicago, county of Cook, and State of Illinois, have invented certain new and useful Improvements in Brake-Shoes, of which I do declare the following to be a full, clear, and exact description, reference being had to the accompanying drawing, forming part of this specification.

The present invention has relation to the improvement of that class of brake shoes commonly known as composite shoes, in which provision is made whereby the wearing face of the shoe shall consist of different portions of relatively hard and soft metal so as to give a more effective wearing and braking action to the shoe.

The object of the invention is, first, to provide an improved composite brake shoe that shall present a more efficient wearing surface, and, second, to provide a composite brake shoe of greater strength and durability.

The invention consists in the features of novelty hereinafter described, and particularly pointed out in the claims at the end of this specification.

Figure 1:
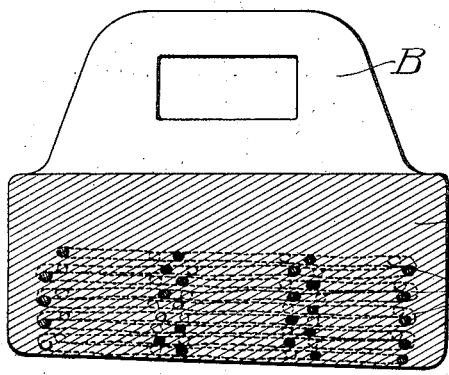
Figure 2:
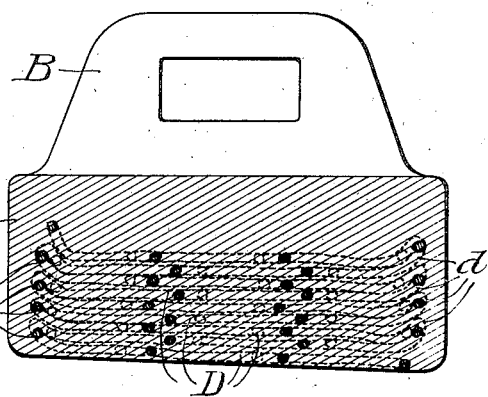
Figure 3:
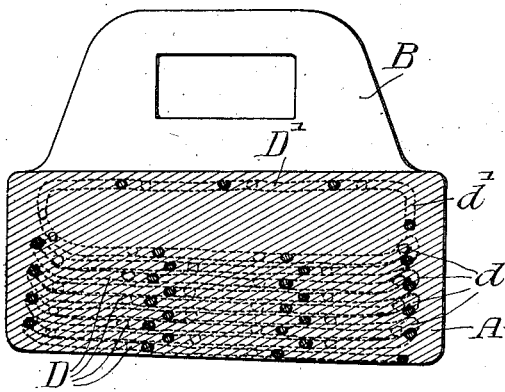
Figure 4:
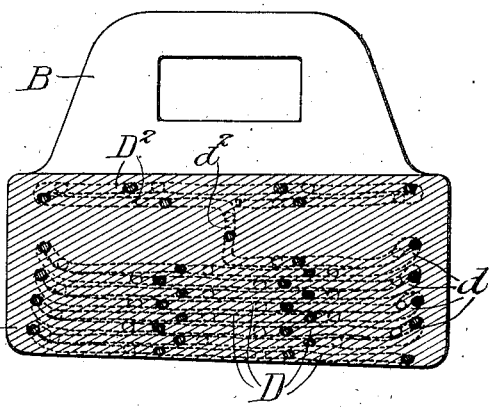
Figure 5:
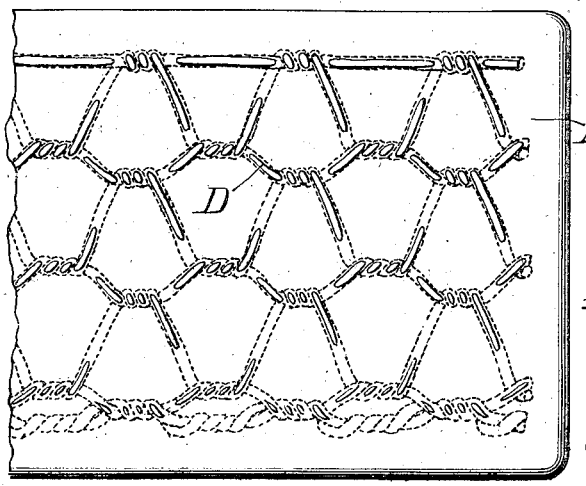

Figure 1 is a view in vertical cross-section through a brake shoe embodying my invention, this view being taken at one side of the central attaching lug of the shoe. Fig. 2 is a view similar to Fig. 1, but showing a modified form of the invention. Figs. 3 and 4 are views similar to Fig. 1, but showing modifications of the invention. Fig. 5 is a face view of a portion of a composite brake shoe embodying my invention. Figs. 6, 7 and 8 are views in central, longitudinal section through brake shoes embodying different forms of my invention. Fig. 9 is a detail view showing a portion of the open-work fabric which is preferably used in the construction of my improved shoe.

Referring to the several views of the drawings, A designates the body of the brake shoe that may be of any suitable shape, this body being formed of cast metal—preferably cast iron—such as is commonly used for the manufacture of brake shoes. As shown, my improved shoe is provided with the usual central attaching lug B and with the raised end lugs C. But it is obvious that any other suitable means for attaching the shoe to the brake head may be employed.

Embedded in the cast metal body A of the shoe are layers D of open-work fabric that extend approximately from end to end of the shoe. The layers D of open-work fabric are superposed one above the other, and, by the term "superposed layers" I mean that the layers of open-work fabric are arranged one above the other, from the wearing face toward the back of the shoe. Preferably, the open-work fabric consists of a wire mesh woven from steel wire, the preferred form of wire mesh being illustrated in Figs. 5 and 9 of the drawings. This material is particularly advantageous, because in making such mesh wire of any desired hardness may be used, and a much harder or more steely kind of metal can be employed than could be used if the fabric were formed of expanded metal. I wish it understood, however, that except where so specified in the claims, my invention is not limited to the particular kind of open-work fabric, since features of the invention may be employed with open-work fabric formed of expanded metal or of wire woven in various ways.

One of the characteristic features of the invention is that the layers of open-work fabric are securely connected together, independently of their connection by the cast metal wherein they are embedded, and this feature of the invention can obviously be employed where the layers are formed of expanded metal or other similar material. In the preferred embodiment of my invention, the several layers D of open-work fabric are formed by taking a length of such fabric and bending or folding it in zig-zag manner, as illustrated in the drawings. In Fig. 1 the layers D are formed by taking a strip of fabric of a width approximately equal to the length of the brake shoe. This fabric is then folded back and forth upon itself until a mass or "mattress" is formed, of sufficient thickness to occupy the larger portion of the body of the shoe. The "mattress" being thus formed of the superposed layers of fabric, it will be placed in the mold and the cast metal will then be poured into the mold and will flow through the interstices and around the edges of the "mattress" so that it shall be securely embedded in the cast metal, as indicated in the several views of the drawings. When the "mattress" is formed, as above described, the several layers of the fabric will rest one upon another and, because of the irregular bends in the wire, incident to the weaving operation, there will be practically no space between the layers of wire, since the wires of one layer of the fabric will extend more or less into the plane of those of the next succeeding layers. Inasmuch as the cast metal in which the layers of fabric are embedded completely envelops the strands or wires of which the fabric is formed, it will be apparent that as the shoe is worn, there will be constantly presented a composite wearing face of cast metal and of sections of the fabric, the wires being cut in the wearing of the shoe upon lines more or less oblique. In the finished shoe the layer of fabric nearest the wearing surface will be partially covered by the cast metal, as indicated in Fig. 5 of the drawing, so that as the shoe is placed in use, its wearing face will from the outset be of a composite character, exposing to the surface of the wheel the hard metal of fabric and the softer metal of which the body of the shoe is composed.

In the form of the invention illustrated in Fig. 1, the layers D of open-work fabric that compose the "mattress" are formed, as above described, by simply folding the layers one upon another. But in the form of the invention illustrated in Fig. 2, the side edges of the layers of fabric where folded are also bent at an angle (preferably upward) to the plane of the superposed layers, as shown at $d$.

In the embodiment of the invention illustrated in Fig. 3 the superposed layers of fabric are folded one upon another, with their side edges bent upward as in Fig. 2, but in this form of the invention there is employed an additional layer D' of the fabric that is extended into the top portion of the shoe and from approximately side to side thereof, the free edge of this top layer D' being preferably bent downward, as shown at $d'$. By thus extending an additional layer of fabric into the top portion of the shoe, such portion of the shoe is materially strengthened and the parts of cast metal comprising it are prevented from falling to the track in case the shoe should become broken after excessive wear.

In the form of the invention illustrated in Fig. 4, I have shown a portion $d^2$ of the fabric extending upward from the "mattress" into the back of the shoe, where it is folded back and forth to form a double layer D² for strengthening this part of the shoe.

In Fig. 6 the several superposed layers of fabric are formed by taking a strip of open-work fabric and folding it back and forth transversely to the length of the shoe, so that the folded edges of the fabric occur adjacent the ends of the shoe.

In Fig. 7, the several layers of fabric are formed from a strip folded, as in Fig. 6, but the edges of the fabric adjacent the ends of the shoe are bent as at $d$ preferably in upward direction.

In the form of the invention shown in Fig. 8, the layers of fabric are folded one upon another, as in Fig. 7, but in this form of the invention an additional layer D' of the fabric is extended into the top part of the shoe at or adjacent its back in order to give greater strength to such portion of the shoe.

It will be seen that with the several forms of my improved shoe, as above described, the superposed layers of fabric, connected as they are and lying one upon another, not only greatly strengthen the shoe and prevent any breaking or falling away of the parts, but also insure an effective distribution of the harder portions of metal throughout the wearing face of the shoe.

The upturned end portion $d$ of each layer in the forms shown in Figs. 2, 3, 4, 7 and 8, are embedded in the cast body of the shoe and aids in holding the layer in place when it is exposed upon the wear face of the shoe. In the forms shown in Figs. 3, 4 and 8, the layers are connected to the strengthening back portions D' and D².

It is obvious that the details set forth may be varied without departure from the essentials of the invention.

Having thus described my invention, what I claim as new, and desire to secure by Letters Patent, is:—

1. A brake-shoe comprising a cast metal body having embedded therein a plurality of superposed layers of metallic, open-work fabric connected together.

2. A brake-shoe comprising a cast metal body having embedded therein a plurality of superposed layers of metallic, open-work fabric connected together at their edges.

3. A brake-shoe comprising a cast metal body having embedded therein a plurality of superposed layers of metallic, open-work fabric folded one layer above another.

4. A brake-shoe comprising a cast metal body having embedded therein a plurality of layers of metallic, open-work fabric, said layers having bent edges.

5. A brake-shoe comprising a cast metal body having embedded therein a plurality of superposed layers of metallic, open-work fabric extending lengthwise of the shoe and bent to form zig-zag folds.

6. A brake-shoe comprising a cast metal body having embedded therein a plurality of superposed layers of metallic, open-work fabric being oppositely inclined.

7. A brake-shoe comprising a cast metal body having embedded therein a plurality of superposed layers of metallic, open-work fabric connected together at their edges, one layer of said fabric extending into the back of the shoe.

8. A brake-shoe comprising a cast metal body having embedded therein a plurality of superposed layers of metallic, open-work fabric, one layer of said fabric extending across the back of the shoe.

9. A brake-shoe comprising a cast metal body having embedded therein a plurality of superposed layers of woven wire netting, said netting being folded back and forth to form said layers.

CLIFTON D. PETTIS.

Witnesses:
ELEANOR HAGENON,
KATHARINE GERLACH.